United States Patent
De Grace et al.

(10) Patent No.: US 12,418,477 B2
(45) Date of Patent: Sep. 16, 2025

(54) SMART SWITCH FOR OFFLOADING HIGH BANDWIDTH FLOWS IN A SOFTWARE DEFINED NETWORK

(71) Applicant: MICROSOFT TECHNOLOGY LICENSING, LLC, Redmond, WA (US)

(72) Inventors: Gerald Roy De Grace, Cumming, GA (US); Deepak Bansal, Bellevue, WA (US); Rishabh Tewari, Sammamish, WA (US); Sushant Sharma, Sammamish, WA (US); Lihua Yuan, Redmond, WA (US); Guohan Lu, Redmond, WA (US); Pranjal Shrivastava, Redmond, WA (US); Geoffrey Outhred, Seattle, WA (US); Avijit Gupta, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/620,725

(22) Filed: Mar. 28, 2024

(65) Prior Publication Data
US 2025/0202809 A1 Jun. 19, 2025

Related U.S. Application Data

(60) Provisional application No. 63/612,166, filed on Dec. 19, 2023.

(51) Int. Cl.
*H04L 45/00* (2022.01)
*H04L 45/74* (2022.01)
(52) U.S. Cl.
CPC ............ *H04L 45/38* (2013.01); *H04L 45/566* (2013.01); *H04L 45/74* (2013.01)

(58) Field of Classification Search
CPC ........ H04L 45/38; H04L 45/566; H04L 45/74
See application file for complete search history.

(56) References Cited

U.S. PATENT DOCUMENTS

| | | | |
|---|---|---|---|
| 11,374,838 B1* | 6/2022 | Finkelshtein | H04L 43/0876 |
| 2021/0127267 A1* | 4/2021 | Dilmaghani | H04L 63/20 |

(Continued)

FOREIGN PATENT DOCUMENTS

| | | | |
|---|---|---|---|
| CN | 111585903 A * | 8/2020 | H04L 47/10 |
| WO | 2023219718 A1 | 11/2023 | |

OTHER PUBLICATIONS

International Search Report and Written Opinion received for PCT Application No. PCT/US2024/055600, Mar. 5, 2025, 15 pages.

*Primary Examiner* — Benjamin M Thieu
(74) *Attorney, Agent, or Firm* — Han Gim; Newport IP LLC

(57) ABSTRACT

Bidirectional flows of a communication session in a software defined network (SDN) are efficiently managed. A smart switch comprises a digital processing unit (DPU) complex comprising one or more DPUs, and a switching complex comprising one or more network processing units (NPUs). The DPU complex is configured to disaggregate enforcement of policies of the SDN from hosts of the SDN. The switching complex is configured to perform network routing of packets in the SDN. The hosts are implemented on servers communicatively coupled to network interfaces of the SDN. The switching complex is configured to perform policy enforcement of data flows for communication sessions that are offloaded from the DPU complex to the switching complex.

20 Claims, 9 Drawing Sheets

(56) References Cited

U.S. PATENT DOCUMENTS

| | | |
|---|---|---|
| 2022/0329527 A1 | 10/2022 | Degrace et al. |
| 2023/0269182 A1* | 8/2023 | Li .................... H04L 69/163 370/392 |
| 2024/0223492 A1* | 7/2024 | Gopalarathnam ...... H04L 45/48 |

* cited by examiner

SMART SWITCH FOR OFFLOADING HIGH BANDWIDTH FLOWS IN A SOFTWARE DEFINED NETWORK

PRIORITY APPLICATION

This application claims the benefit of a priority to U.S. Provisional Application No. 63/612,166, filed Dec. 19, 2023, the entire contents of which are incorporated herein by reference.

BACKGROUND

A data center houses computer systems and various networking, storage, and other related components. Data centers are, for example, used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

In some SDNs, processing of data packets is offloaded from host servers to devices that house data processing units (DPUs). Disclosed herein are systems and methods that enable offload of selected fast path packet flows from DPUs to network processing units (NPUs) that are typically used for network switching functions. In an embodiment, a smart switch is disclosed that houses NPUs as well as a DPU complex. An NPU complex that is capable of performing fast path packet processing enables further disaggregation of fast path packet flows from the DPU complex to the network. Offloading fast path packet processing to the DPU complex enables high-bandwidth flows to be processed in the network (via the NPU complex) which have higher network bandwidth as compared to the DPU complex. When the DPU complex detects such a high bandwidth flow, the DPU complex sends a FastPath++ packet to the NPU complex that includes matches and actions for a given policy. This signals to the NPU complex that the described data flow should be processed by the NPU complex.

The present disclosure provides techniques to allow for efficiency improvements in establishing and maintaining connection states across devices in an SDN. The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

BRIEF DESCRIPTION OF DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
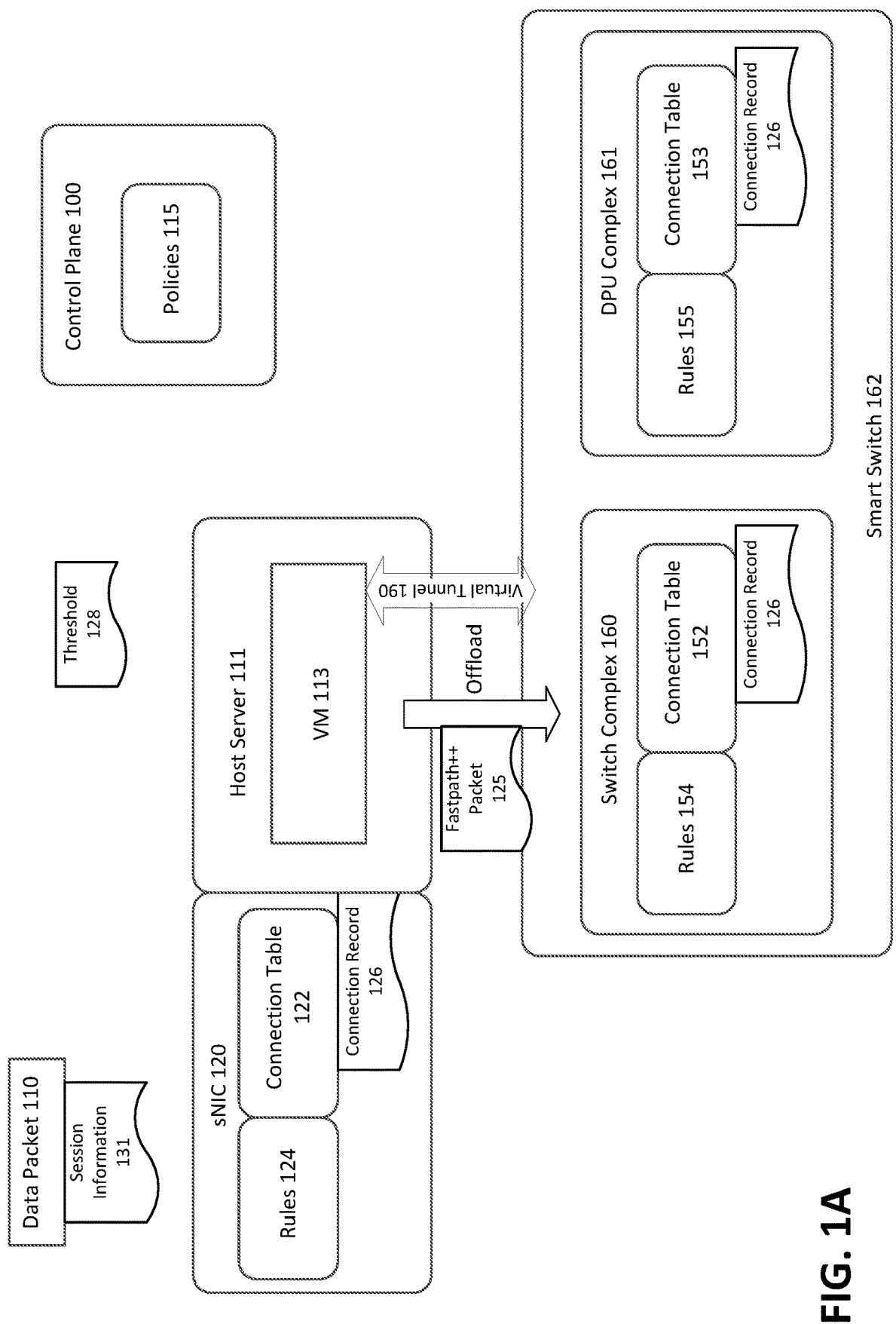
FIG. 1A is a diagram illustrating an example architecture in accordance with the present disclosure.

The disclosed embodiments enable datacenters to provide services in a manner that can reduce the cost and complexity of their networks, allowing for more efficient use of computing, storage, and network resources. Efficient implementation of the end-to-end service by a cloud service provider can enable an experience that is seamless and more consistent across various footprints. The integration of multi-tenant and single-tenant resources with a comprehensive resource management approach can also minimize the overhead for the user, who will not need to address policy enforcement issues and perform other complex management tasks. The efficient implementation of the described synchronization functions can provide improvements for various performance and security metrics such as latency and data security.

The present disclosure describes embodiments for optimizing the processing of data flows in SDNs that include network processing units (NPUs) in smart switches, data processing units (DPUs) in smart switches and other devices such as SDN appliances, and various other devices to efficiently manage connections and utilization of associated services. An NPU, in one example, is a processing component that is configured for networking applications such as in routers, network switches, session controllers, firewall devices, and the like. A DPU, in one example, is a processing component that is configured for packet processing and can be implemented as hardware, software, or a combination. In one embodiment, the NPU or DPU is implemented as an ASIC. As discussed further herein, DPU and NPU processing can include fast path and slow path processing within a programmable data path. The slow path evaluates every connection (data flow) against a set of rules that can be complex in nature. The rules dictate whether a packet is allowed to continue to its destination either directly or through an intermediate device. For example, the rules can cover allow, deny, or mirror actions as well as the transformation that the packet must undergo including any modification to the packet or tunnel layers. The rules can be applied in both directions for any packet that leaves or attempts to enter a virtual machine (VM) or container. Cloud environments typically support this type of functionality to ensure that virtual machines remain within their virtual network and are not allowed to access any other virtual networks or networking functions.

The processing associated with such rule application can be complex and consist of many thousands of rules and related tables. After the processing is complete for the first packet of a connection (this processing is referred to as the "slow path"), the connection can subsequently be matched according to the connection's 5 tuple without performing the full rule processing. For this reason, the connection can be placed into a "fast path" where the exact matched connection and transformation can be consulted using much simpler table lookup algorithms. This results in much higher ongoing performance for established connections. Although fast path processing is much simpler than slow path processing, the capacity to continuously add more connections can be limited. For example, the table to hold the established connections can sometimes reach their capacity and can limit the number of connections that a VM can source or sink. Furthermore, some connections can involve the exchange of large amounts of data and can consume significant amounts of bandwidth.

The allocation of devices such as smart switches can be matched to the deployed servers within compute clusters comprising a cluster of servers. In some cases, some portion of fast path flows allocated to a smart switch can include high bandwidth flows that can approach the capabilities of a smart switch to keep up with connection processing, connection table expansion, or other tasks, or approach the bandwidth capabilities of a given network. This portion of high bandwidth flows can vary based on the deployment workloads. It is desirable to selectively offload such high bandwidth connections to respond to actual local and network conditions.

The disaggregation techniques described herein allow for the offload of selected flows to a switching complex. Such a switching complex may be referred to herein as an ASIC switch complex or an NPU complex. The switching complex can be part of a smart switch, or can be housed as a separate device. Selected flows can be offloaded to a switch complex to process SDN data path rules and transformations in a manner that is further disaggregated to the network such that packets of offloaded flows can be processed before the packets are delivered to a DPU complex which had previously performed the packet processing.

In some embodiments, the DPU complex or other user can select a flag, send a packet, or employ some other mechanism to move the SDN data path rule and transformation processing for the DPU complex to a switching complex. In some embodiments, the use of a packet to move the SDN data path rule and transformation processing can be performed using a FastPath++ packet. By pushing connections being processed by a DPU complex to the switching complex in this manner, the smart switch continues to process SDN workloads in the DPU complex while a portion of the workloads are re-directed to the smart switch's switching complex. This can be a cost-effective way to increase the capabilities of an SDN network because only a portion of workloads may require high processing rates or niche services that require the speed enhancements allowed by offloading fast path processing to the switching complex.

The present disclosure thus provides a way to optimize the use of the DPU complex infrastructure along with a switching complex with NPUs. In an embodiment, a user, VM, SDN appliance, or the DPU complex can flag the need for this capability. In some embodiments, the system can detect the need for the offload dynamically using thresholds or other mechanisms. As used herein, a DPU complex and a switching complex with one or more NPUs can be implemented as one or more devices that are configured to process packets in the manner described herein, which can include an appliance or a smart switch and optionally a server or other computing device.

The content of a FastPath++ packet can include inner flow 5 tuples: SRC, DST, SRC Port, DST Port, Protocol, and a Routing Action (e.g., Encapsulation with SRC IP, DST IP). The switching complex is configured to create a full data flow based on this match action information and process the flow locally without forwarding flow packets to the DPU complex or other appliance for further policy enforcement. The switching complex can further send additional FastPath++ packets to terminate processing of a flow, or the switching complex can use the age of the flow to determine when to stop or remove an offloaded flow.

The present disclosure thus describes a new generation switching complex that enables offload of selected fast path packet flows to the new generation switching complex. The switching complex can be a complex of NPUs that are also configured to perform network routing/switching functions, allowing for further disaggregation from a DPU complex or appliance that was previously performing fast path packet processing. This offloading thus enables the packets of an offloaded flow to be processed and forwarded to their destination without having to be delivered first to an intermediate destination for packet processing. Offloading of packet processing to the switching complex enables high-bandwidth flows to be processed in the network (via the switching complex) which has higher network bandwidth as compared to the DPU complex or other appliances. When the DPU complex detects such a high bandwidth flow, the DPU complex sends a FastPath++ packet to the switching complex that includes matches and actions for a given policy. It should be noted that the disclosed embodiments can be embodied in various implementations of a smart switch which can also include network devices that are configured to operate in various parts of a network including a smart top-or-rack (ToR) switch as well as higher tier devices.

In an embodiment, the NPUs of the switching complex have the ability to support flow offload protocol from a DPU, so that there is no SDN policy storage needed on the NPUs. The DPU will send a FastPath++ packet, which contains matches and actions. The NPU can create the full flow based on this match action and stop forwarding that 5 tuple to the DPU for processing. It should be understood that the FastPath++ packet is an example implementation, and that other examples of packets or indications can be used.

The following illustrates example content of a DPU to NPU FastPath++ Packet:

Flow inner 5 tuples: SRC: 10.0.0.1 DST: 10.0.0.10 SRC Port: 63000 DST port: 22 Protocol: TCP Routing Action: Encapsulation with SRC IP—100.0.0.100, DST IP: 100.0.0.200 (This is one of the routing actions)

In an embodiment, the NPU has sufficient memory to hold a specified number of flows. In an embodiment, the NPU uses Ternary Content Addressable Memory (TCAM) or High Bandwidth Memory (HBM). Additionally, the switching complex can be configured to define and handle flow aging and flow purge. The switching complex can further implement a meter or other counting mechanism to track the number of flows being handled by the switching complex.

Figure 1B:
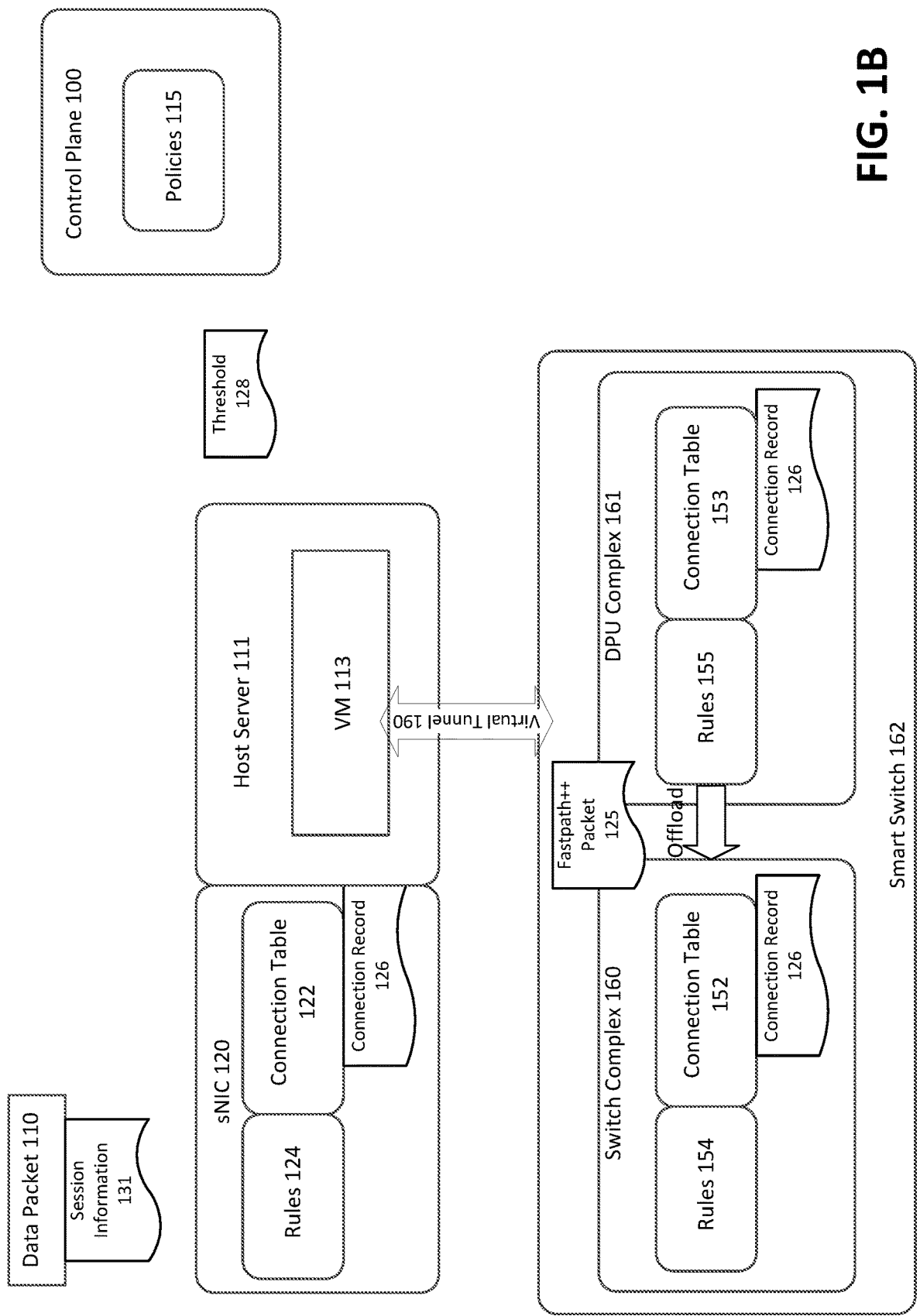
FIG. 1B is a diagram illustrating an example architecture in accordance with the present disclosure.
Figure 1C:
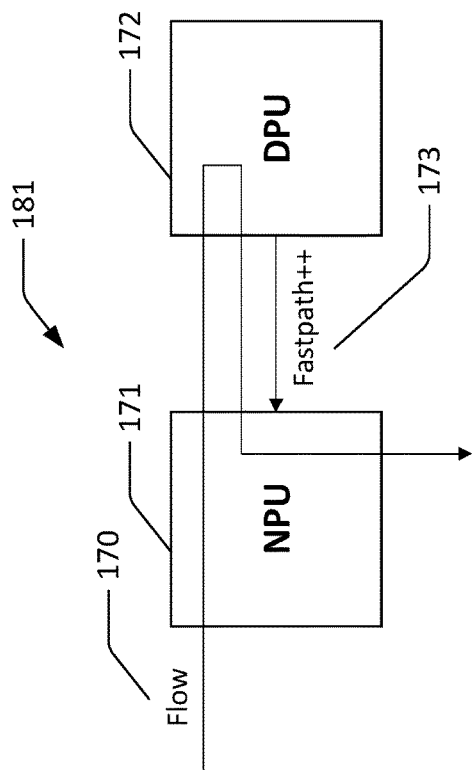
FIG. 1C is a diagram illustrating an example architecture in accordance with the present disclosure.
Figure 1C:
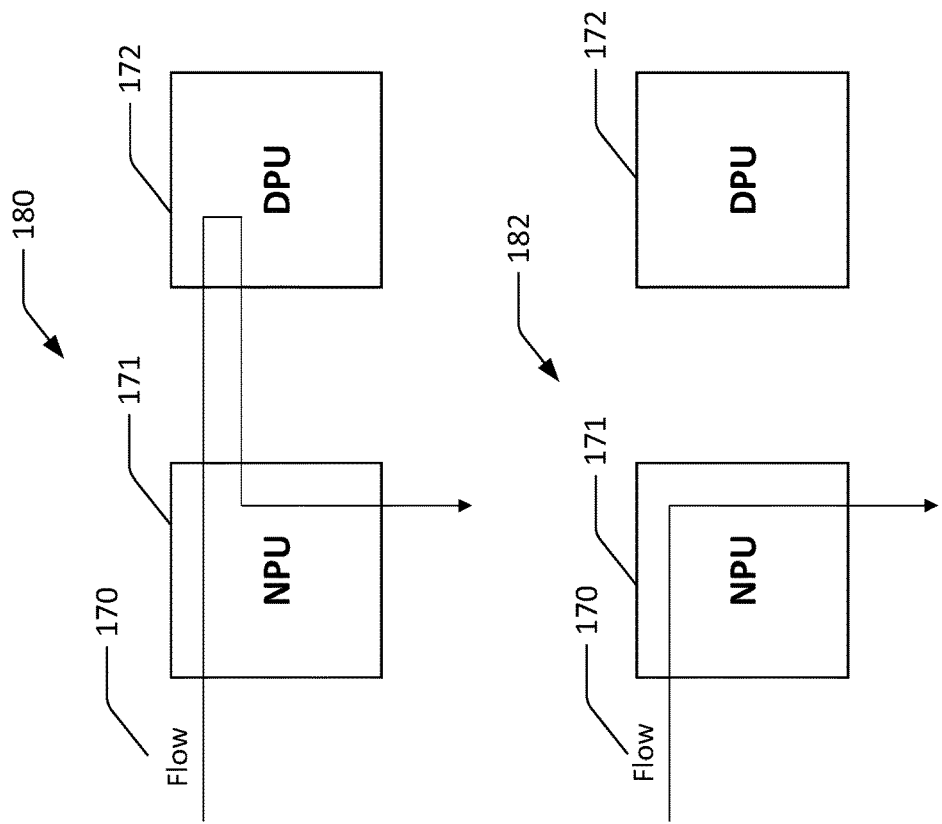
Figure 1D:
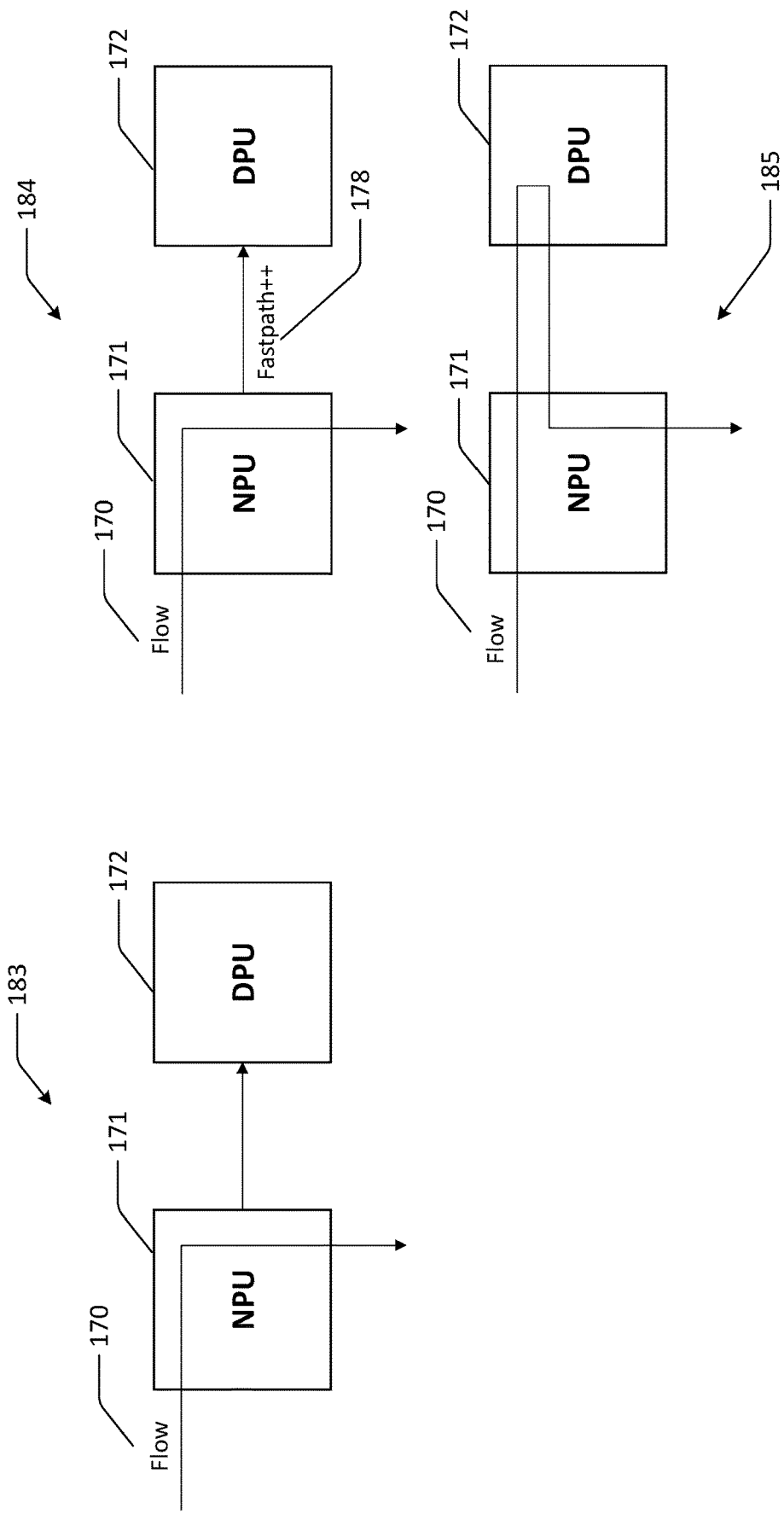
FIG. 1D is a diagram illustrating an example architecture in accordance with the present disclosure.

FIG. 1C and FIG. 1D show an example flow through a NPU 171 and DPU 172. FIG. 1C illustrates an example flow 170. Scenario 180 illustrates that packets in the flow 170 are routed by the NPU 171 to the DPU 172 for processing. The DPU 172 sends processed packets to the NPU 171 for routing to a destination in the network. Scenario 181 illustrates that Fastpath++ message 173 is sent from the DPU 172 to NPU 171 to move the fast path for a flow to be implemented on the NPU 171. Scenario 182 illustrates that packets for the flow 170 are no longer routed to DPU 172. Packets are now processed at NPU 171 and routed to a destination in the network without having to route to NPU 171 for processing.

FIG. 1D illustrates, in scenario 183, packets for a flow 170 are being processed at NPU 171 and routed to a destination in the network without having to route to NPU 171 for processing. FIG. 1D further illustrates that, in scenario 184, NPU 171 can send a flow back to the DPU 172 using Fastpath++ message 178 for continued flow processing. For example, NPU 171 can send Fastpath++ message 178 due to aging of the flow or end of the flow 170. NPU 171 and DPU 172 may perform cleanup operations on both sides to remove the flow. For example, if a flow that was previously indicated as high bandwidth is no longer consuming high bandwidth, then the flow can be sent back to the DPU 172. After the Fastpath++ message 178 is received by DPU 172 to indicate that the flow is to be sent back to the DPU 172, the flow is removed from NPU 171 in scenario 185, which illustrates that flow 170 is now forwarded from NPU 171 to DPU 172 for processing of the flow 170. The DPU 172 sends processed packets to the NPU 171 for routing to a destination in the network.

In various embodiments, if a performance threshold is reached on the host, appliance, or DPU complex, the host, appliance, or DPU complex can request an SDN controller or other management function to apply SDN rules to the switching complex and cause the switching complex to be the preferred route on the way to the destination. In another embodiment, the DPU complex itself can initiate and perform the offload without the need to invoke a management function. This process can include the switching complex parsing and identifying the rules and policies that are applicable to the destination and initiating a process to synchronize the associated connections from the destination (or the server hosting the destination) to the switching complex. In one embodiment, packets can be directed to the switching complex for application of the rules and policies. For example, the routing can be achieved by updating the next hop IP address of the tunnel set up for the communication to the destination. Once the tunnel rule is updated, any new connections will start to flow through the switching complex. Before updating the tunnel rules, the connection manager or other function can perform a synchronization process to ensure that the switching complex is capable of handling both established and any new connections. Assuming the switching complex is preferred over the DPU complex, the number of new connections can be reduced for a short period of time so that the overhead of dynamically synchronizing new connections is low.

In one embodiment, an example sequence in accordance with the disclosed embodiments is as follows:

A performance or table threshold is reached.

A request is sent to move an SDN data path to the switching complex of a smart switch.

Policies of the associated VM or destination are updated to the switching complex of a smart switch. In an embodiment, an SDN policy enforcement/forwarding engine manages connections generally.

The DPU complex performs a synchronization to the switching complex.

Once synchronization is complete, the tunnel route on the destination (e.g., VM host) is updated to send all new connections to the switching complex.

Connections for a short period of time may arrive at the DPU complex, but no longer than the time required to re-route the connection paths through the switching complex.

These connections will be processed at the DPU complex. However, the connection state will also be forwarded to the switching complex.

The switching complex will process any packets for the connection as they arrive.

After a period of time, all connections for the workload will flow through the switching complex.

All packets for the workload will no longer flow directly to the DPU complex.

The DPU complex will be able to remove the connection as it is not flowing through the tunnel between itself and the destination, freeing up resources on the DPU complex.

After this sequence is complete, policy processing and forwarding is performed by the switching complex with higher network performance.

The described process can move connections between the switching complex and the DPU complex in the reverse direction. This can take place, for example, in response to determining that the threshold is no longer being met or otherwise that the performance provided by switching complex offloading is no longer needed. Returning a connection to the DPU complex allows the smart switch and SDN overall to be optimally utilized and leads to less overall overhead while optimally maintaining the level of performance provided to the SDN network in general.

The smart switches can be more optimally utilized as connection processing can be dynamically moved between the DPU complex and the switching complex based on various thresholds such as bandwidth, connections per second (CPS), table size, number of idle connections, etc. This avoids the use of the switching complex for high bandwidth needs that are no longer needed, or for smart switches that only need the performance of the switching complex on an infrequent basis.

As used herein, a device that is configured to track connections in a software defined network (SDN) may include network devices, appliances, switches, and other devices that are implemented for processing packets in SDNs and other architectures that require processing of packets that are associated with various sessions and connections. Such devices may also be referred to as an accelerator device. For example, with reference to FIG. 1A, illustrated is an example architecture illustrating packet processing according to the disclosed embodiments. In one example, a data packet 110 in a data flow may be received via a sNIC 120. Packet 110 may be identified and sent to a policy enforcement/forwarding engine in sNIC 120 that is configured to manage processing of data flows. In some embodiments, the policy enforcement/forwarding engine runs on host server 111. In some embodiments, the sNIC 120 can be part of an SDN appliance or other complex that includes smart NICs, a DPU appliance, and the like. Slow path connections may be performed by policy enforcement/forwarding engine and inserted into a connection table 122. The policy enforcement/forwarding engine may apply applicable SDN policies 115 for the data flow associated with the data packet 110 and terminate application of the policies when the data flow is complete. Policy enforcement rules 124 may be applied for SDN policies 115 that are received, for example, from the SDN control plane 100. In an embodiment, VM 113 may offload enforcement of policies 115 to fast path packets of a flow to the smart switch 162 rather than at sNIC 120. In some embodiments, processing of a flow may be offloaded to DPU complex 161. In other embodiments, processing of a flow may be offloaded directly to switch complex 160. A virtual tunnel 190 may be implemented between VM 113 and smart switch 162, through which packets for offloaded connections are sent to the smart switch 162. With reference to FIG. 1B, if a flow was offloaded to DPU complex 161, the DPU complex 161 may offload processing of the flow to switch complex 160.

In an example, FIGS. 1A, 1B, 1C, and 1D illustrate an example of managing connections or bidirectional flows of a communication session in a software defined network (SDN) comprising a host server 111 hosting a virtual machine 113. The SDN further comprises a smart switch 162. In some embodiments, smart switch 162 can be remote or can be a different appliance hosting a plurality of DPUs. In some embodiments, one or more NPUs can be hosted on the smart switch 162. As used herein, hosts can also be referred to as computing nodes which can be physical or virtual computing devices having a physical or virtual processor and memory.

Session information 131 for the communication session is stored in a connection record 126. FIG. 1A illustrates that Fastpath++ packet 125 is sent to offload rules enforcement to the switch complex 160. The Fastpath++ packet 125 indicates that rules applicable to the packet 110 and session 131 should be enforced by the switch complex 160. In various embodiments, the Fastpath++ packet 125 can originate from various components depending on the particular implementation. The switch complex 160 parses the rules 124 and performs a synchronization of rules that are applicable to packet 110 and session 131. As a result, subsequent data packets 110 that are part of session 131 will be processed by switch complex 160. These actions can be performed by DPU complex 161 and switch complex 160.

In an example, the Fastpath++ packet 125 can be sent to switch complex 160 when it is determined that the communication session associated with packet 110 meets a threshold 128 for offloading rules enforcement of the communication session associated with packet 110 to switch complex 160. The Fastpath++ packet 125 indicates that rules applicable to the data packet 110 should be enforced by the smart switch 162.

Methods for creating a fast path connection record when a SYN packet arrives can be similar to what is commonly referred to as "slow path" as described in Disaggregated APIs for SONiC Hosts (DASH) open-source documentation found within Github. Connection flows can be re-simulated using the techniques described in application Ser. No. 17/855,730 "RE-SIMULATION OF UPDATED SDN CONNECTION FLOWS" filed Jun. 30, 2022, the contents of which are incorporated herein by reference. State synchronization can be achieved using the techniques described in application Ser. No. 17/958,346 "EFFICIENT STATE REPLICATION IN SDN NETWORKS" filed Oct. 1, 2022, the contents of which are incorporated herein by reference.

Figure 2:
FIG. 2 is a diagram illustrating an example connection record in accordance with the present disclosure.

FIG. 2 illustrates an example record of a fast path connection table 200. Connection table 200 illustrates an entry for a connection key 210 that includes a Destination IP, Source IP, Destination Port, Source Port, and Protocol ID. Forwarding Instruction 220 may include, for example, an Output Interface that may indicate where the packet needs to go, such as identify an interface at a network interface card (NIC). Transformation Instructions 230 may include a Transformation Pointer into the Transformation Table. The instructions may indicate the transformations identified for packets in the flow such as applying a tunnel on it, changes of source or destination addresses, new filters, etc. Metering 240 may include a series of metering contents for the connection/flow. Metering may allow for charging based on usage, for example.

The Connection Key 210 may be a constant for the duration of the record. The Forwarding Instruction 220 output interface can be updated by the SDN control plane via re-simulation. Transformation Instructions 230 can be updated by the SDN control plane via-re-simulation. Metering 240 may be valid while the record is constant or aggregated and sent upwards if the record is changed. Connection state information 250 includes various information needed for each connection or flow.

Figure 3:
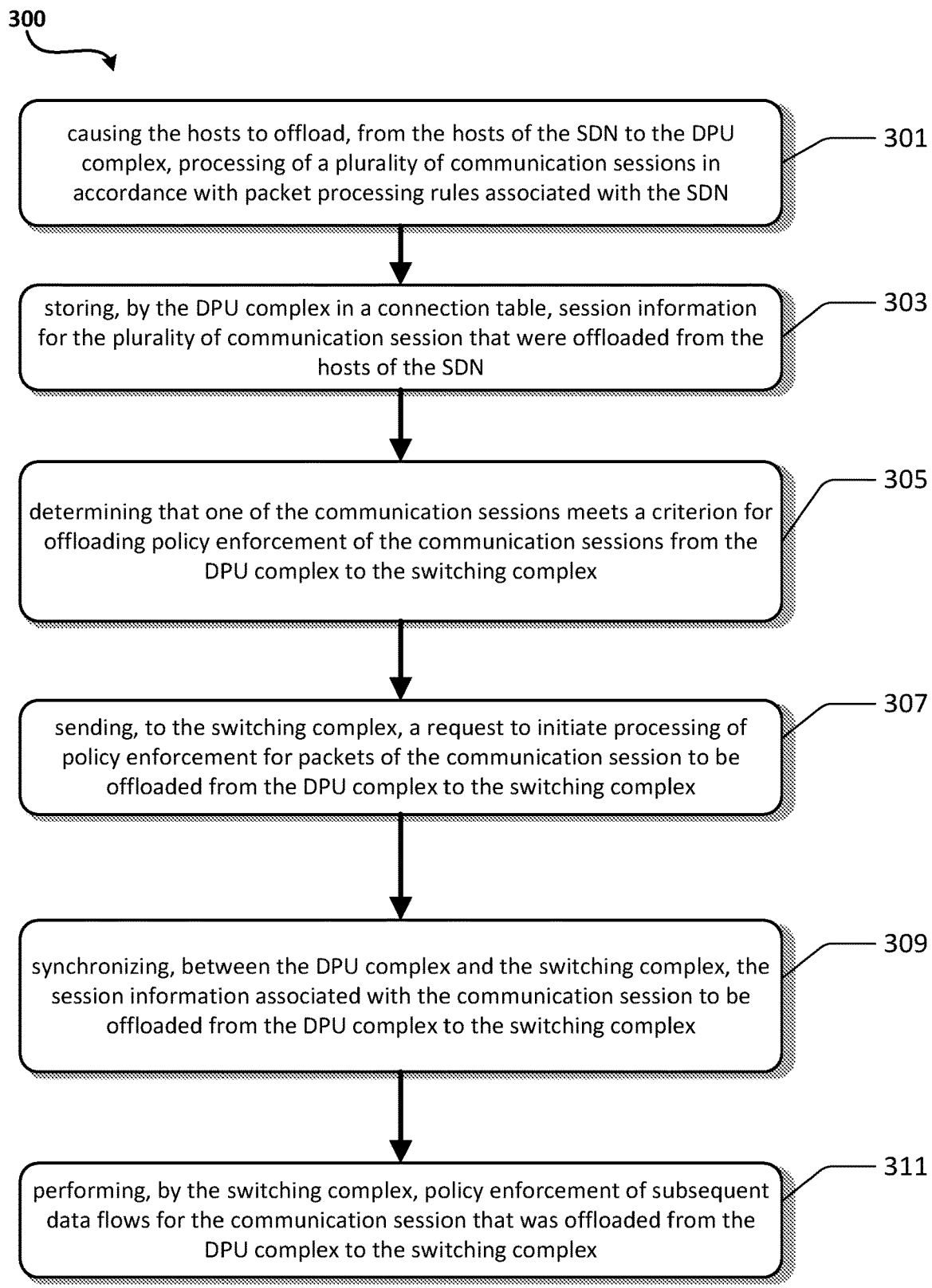
FIG. 3 is a flowchart depicting an example procedure in accordance with the present disclosure.

Turning now to FIG. 3, illustrated is an example operational procedure for managing data flows of communication sessions in a software defined network (SDN). In an embodiment, the SDN comprises a smart switch comprising a digital processing unit (DPU) complex comprising one or more DPUs, and a switching complex comprising one or more network processing units (NPUs). In an embodiment, the DPU complex is configured to disaggregate enforcement of policies of the SDN from hosts of the SDN. In an embodiment, the switching complex is configured to perform network routing of packets in the SDN. In an embodiment, the hosts are implemented on servers communicatively coupled to network interfaces of the SDN.

Such an operational procedure can be provided by one or more components illustrated in FIGS. 1A through 1D. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates causing the hosts to offload, from the hosts of the SDN to the DPU complex, processing of a plurality of communication sessions in accordance with packet processing rules associated with the SDN.

Operation 303 illustrates storing, by the DPU complex in a connection table, session information for the plurality of communication sessions that were offloaded from the hosts of the SDN.

Operation 305 illustrates determining that one of the communication sessions meets a criterion for offloading policy enforcement of the communication sessions from the DPU complex to the switching complex. In an embodiment, the criterion indicates that a given communication session is to be offloaded from the DPU complex to the switching complex.

Operation 307 illustrates in response to the determining, sending, to the switching complex, a request to initiate processing of policy enforcement for packets of the communication session to be offloaded from the DPU complex to the switching complex.

Operation 309 illustrates in response to receiving the request, synchronizing, between the DPU complex and the switching complex, the session information associated with the communication session to be offloaded from the DPU complex to the switching complex. In an embodiment, the synchronizing enables data flows associated with the communication session to be offloaded from the DPU complex to the switching complex to be processed by the switching complex.

Operation 311 illustrates performing, by the switching complex, policy enforcement of subsequent data flows for the communication session that was offloaded from the DPU complex to the switching complex.

Figure 4:
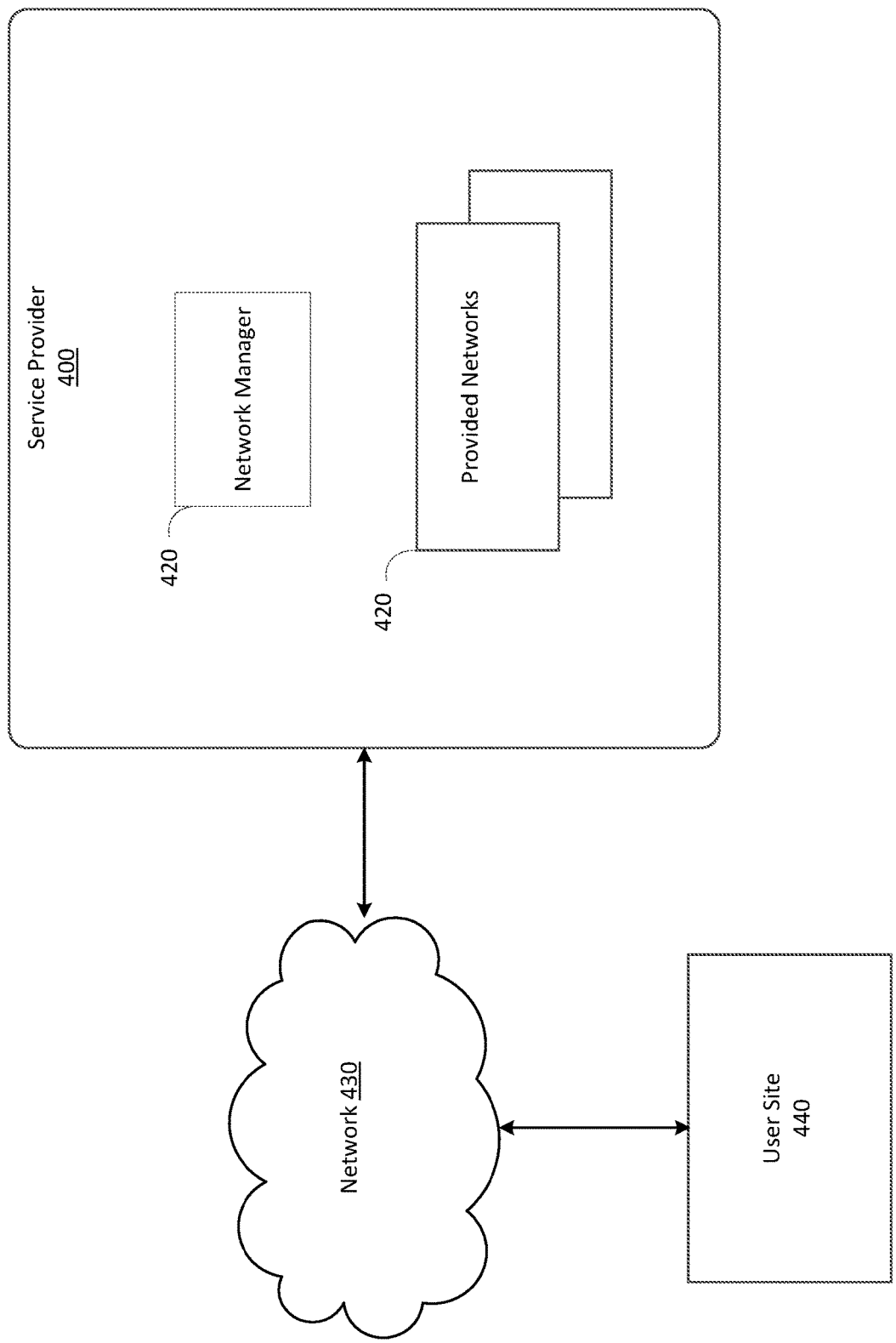
FIG. 4 is an example computing system in accordance with the present disclosure.

FIG. 4 illustrates an example computing environment in which the embodiments described herein may be implemented. FIG. 4 illustrates a service provider 400 that is configured to provide computing resources and provided networks 420 to users at user site 440. The user site 440 may have user computers that may access services provided by service provider 400 via a network 430. The computing resources provided by the service provider 400 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 400 may have various computing resources including servers, routers, and other devices that may provide remotely accessible computing and network resources using, for example, virtual machines. Other resources that may be provided include data storage resources. Service provider 400 may also execute functions that manage and control allocation of network resources, such as a network manager 420.

Network 430 may, for example, be a publicly accessible network of linked networks and may be operated by various entities, such as the Internet. In other embodiments, network 430 may be a private network, such as a dedicated network that is wholly or partially inaccessible to the public. Network 430 may provide access to computers and other devices at the user site 440.

Figure 5:
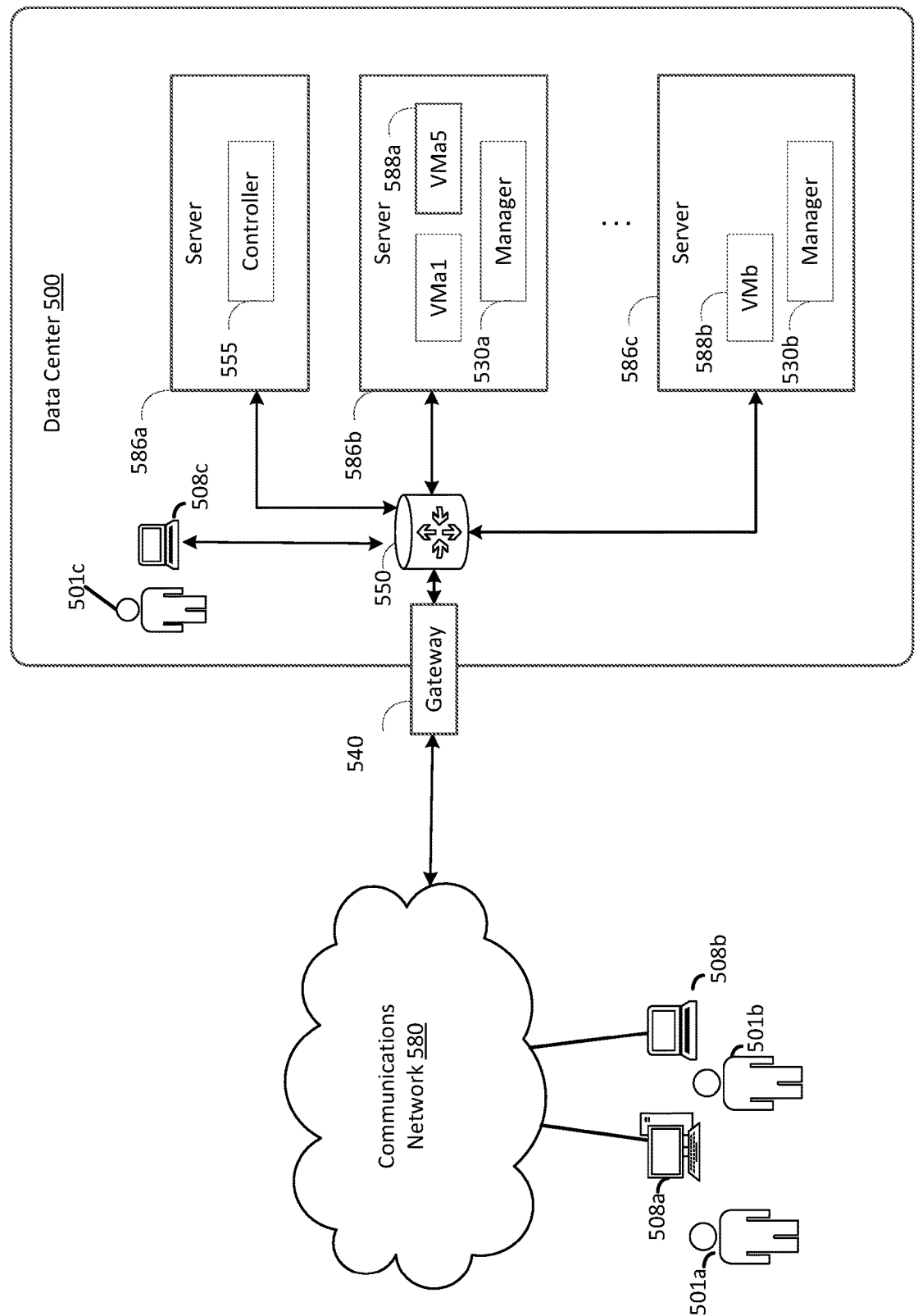
FIG. 5 is a diagram illustrating a data center in accordance with the present disclosure.

FIG. 5 illustrates an example computing environment in which the embodiments described herein may be implemented. FIG. 5 illustrates a data center 500 that is configured to provide computing resources to users 501a, 501b, or 501c (which may be referred herein singularly as "a user 501" or in the plural as "the users 501") via user computers 508a, 508b, and 508c (which may be referred herein singularly as "a computer 508" or in the plural as "the computers 508") via a communications network 580. The computing resources provided by the data center 500 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 500 may include servers 586a, 586b, and 586c (which may be referred to herein singularly as "a server 586" or in the plural as "the servers 586") that may be standalone or installed in server racks, and provide computing resources available as virtual machines 588a and 588b (which may be referred to herein singularly as "a virtual machine 588" or in the plural as "the virtual machines 588"). The virtual machines 588 may be configured to execute applications such as Web servers, application servers, media servers, database servers, and the like. Other resources that may be provided include data storage resources (not shown on FIG. 5) and may include file storage devices, block storage devices, and the like. Servers 586 may also execute functions that manage and control allocation of resources in the data center, such as a controller 555. Controller 555 may be a fabric controller or another type of program configured to manage the allocation of virtual machines on servers 586.

Referring to FIG. 5, communications network 580 may, for example, be a publicly accessible network of linked networks and may be operated by various entities, such as the Internet. In other embodiments, communications network 580 may be a private network, such as a corporate network that is wholly or partially inaccessible to the public.

Communications network 580 may provide access to computers 508. Computers 508 may be computers utilized by users 501. Computer 508a, 508b or 508c may be a server, a desktop or laptop personal computer, a tablet computer, a smartphone, a set-top box, or any other computing device capable of accessing data center 500. User computer 508a or 508b may connect directly to the Internet (e.g., via a cable modem). User computer 508c may be internal to the data center 500 and may connect directly to the resources in the data center 500 via internal networks. Although only three user computers 508a,508b, and 508c are depicted, it should be appreciated that there may be multiple user computers.

Computers 508 may also be utilized to configure aspects of the computing resources provided by data center 500. For example, data center 500 may provide a Web interface through which aspects of its operation may be configured through the use of a Web browser application program executing on user computer 508. Alternatively, a stand-alone application program executing on user computer 508 may be used to access an application programming interface (API) exposed by data center 500 for performing the configuration operations.

Servers 586 may be configured to provide the computing resources described above. One or more of the servers 586 may be configured to execute a manager 530a or 530b (which may be referred herein singularly as "a manager 530" or in the plural as "the managers 530") configured to execute the virtual machines. The managers 530 may be a virtual machine monitor (VMM), fabric controller, or another type of program configured to enable the execution of virtual machines 588 on servers 586, for example.

It should be appreciated that although the embodiments disclosed above are discussed in the context of virtual machines, other types of implementations can be utilized with the concepts and technologies disclosed herein.

In the example data center 500 shown in FIG. 5, a network device 550 may be utilized to interconnect the servers 586a and 586b. Network device 550 may comprise one or more switches, routers, or other network devices. Network device 550 may also be connected to gateway 540, which is connected to communications network 580. Network device 550 may facilitate communications within networks in data center 500, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 500 described in FIG. 5 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a case in which at least some tasks are implemented in hard ASIC logic or the like, or a case in which at least some tasks are implemented in soft (configurable) logic or the like, a case in which at least some tasks run as software on software processor overlays or the like; a case in which at least some tasks run as software on hard ASIC processors or the like, etc., or any combination thereof. A component may represent a homogeneous collection of hardware acceleration devices. On the other hand, a component may represent a heterogeneous collection of different types of hardware acceleration devices including different types of devices having different respective processing capabilities and architectures, a mixture of devices and other types hardware acceleration devices, etc.

Figure 6:
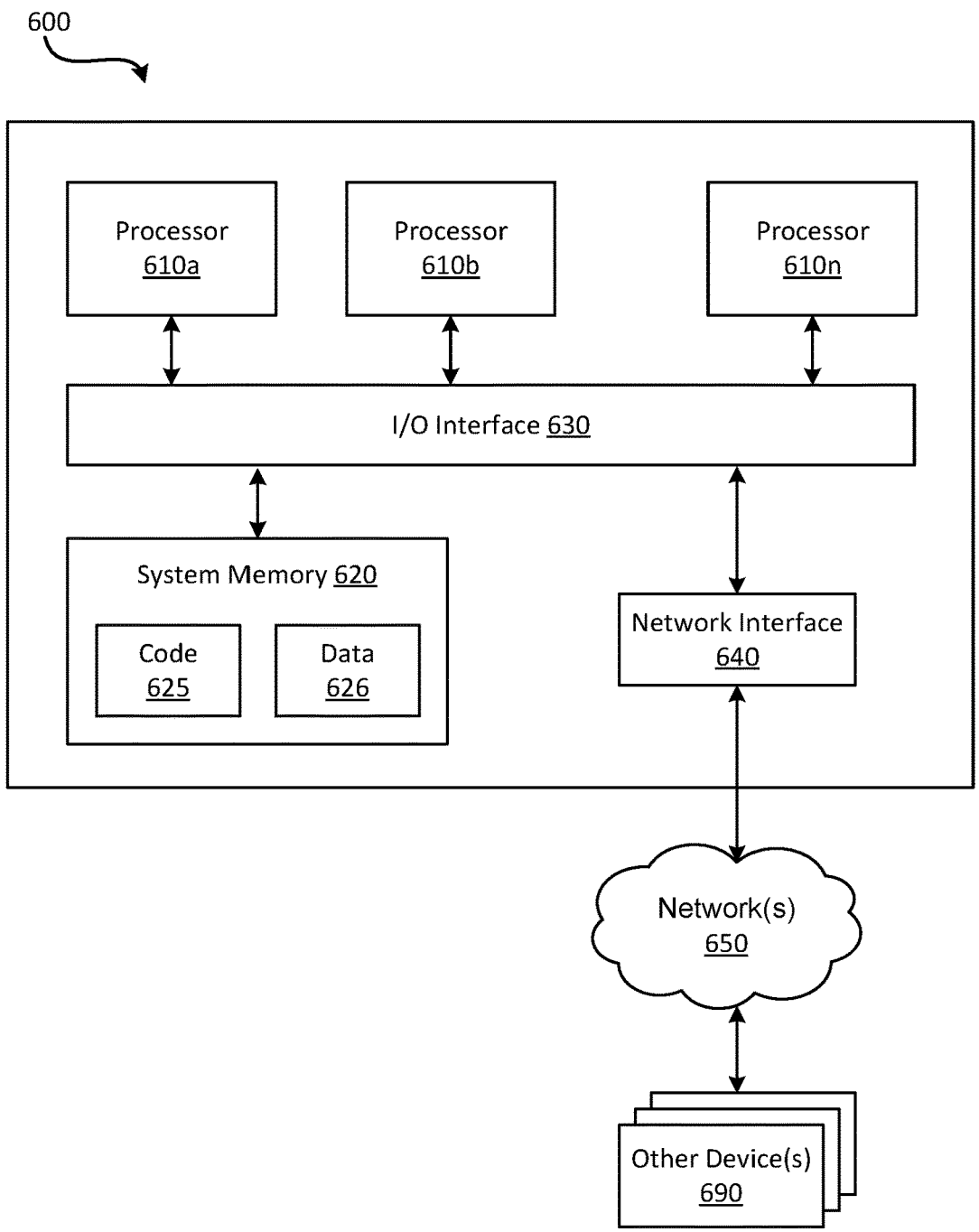
FIG. 6 is a diagram illustrating an example system in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 690 attached to a network or network(s) 650, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media.

These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims. Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing data flows of communication sessions in a software defined network (SDN) implementing a smart switch comprising:
  a digital processing unit (DPU) complex comprising one or more DPUs, and
  a switching complex comprising one or more network processing units (NPUs),
  wherein:
    the DPU complex is configured to disaggregate enforcement of policies of the SDN from hosts of the SDN,
    the switching complex is configured to perform network routing of packets in the SDN,
    the hosts are implemented on servers communicatively coupled to network interfaces of the SDN,
  the method comprising:
  causing the hosts to offload, from the hosts of the SDN to the DPU complex, processing of a plurality of communication sessions in accordance with packet processing rules associated with the SDN;
  storing, by the DPU complex in a connection table, session information for the plurality of communication sessions that were offloaded from the hosts of the SDN;
  determining that one of the communication sessions meets a criterion for offloading policy enforcement of the communication sessions from the DPU complex to the switching complex, wherein the criterion indicates that a given communication session is to be offloaded from the DPU complex to the switching complex;
  in response to the determining, sending, to the switching complex, a request to initiate processing of policy enforcement for packets of the communication session to be offloaded from the DPU complex to the switching complex;
  in response to receiving the request, synchronizing, between the DPU complex and the switching complex, the session information associated with the communication session to be offloaded from the DPU complex to the switching complex, wherein the synchronizing enables data flows associated with the communication session to be offloaded from the DPU complex to the switching complex to be processed by the switching complex; and
  performing, by the switching complex, policy enforcement of subsequent data flows for the communication session that was offloaded from the DPU complex to the switching complex.

Clause 2: The method of clause 1, wherein the request comprises a FastPath++ packet that includes matches and actions for a given policy.

Clause 3: The method of any of clauses 1-2, wherein the switching complex is configured to create a data flow based on the matches and actions and process the communication session to be offloaded from the DPU complex to the switching complex locally in the switching complex without forwarding packets associated with the one communication session to the DPU complex.

Clause 4: The method of any of clauses 1-3, method of claim 3, wherein the matches and actions include encapsulation with a SRC IP and DST IP.

Clause 5: The method of any of clauses 1-4, further comprising sending an additional FastPath++ packet to terminate processing of the communication session to be offloaded from the DPU complex to the switching complex by the switching complex.

Clause 6: The method of any of clauses 1-5, wherein the switching complex is configured to use an age of the communication session to be offloaded from the DPU complex to the switching complex to determine when to stop or remove the communication session to be offloaded from the DPU complex to the switching complex.

Clause 7: The method of any of clauses 1-6, wherein the switching complex is configured to terminate processing of the communication session to be offloaded from the DPU complex to the switching complex in response to receiving a FIN/FIN ACK/ACK for the communication session to be offloaded from the DPU complex to the switching complex.

Clause 8: The method of any of clauses 1-7, wherein the determining that the communication session to be offloaded from the DPU complex to the switching complex meets the criterion comprises meeting a bandwidth threshold.

Clause 9: The method of any of clauses 1-8, wherein the synchronization comprises parsing a plurality of packet processing rules to identify packet processing rules that are applicable to a source or destination of the communication session to be offloaded from the DPU complex to the switching complex.

Clause 10: The method of any of clauses 1-9, wherein the synchronization comprises parsing a plurality of packet processing rules to identify packet processing rules that are applicable to a source or destination of the communication session to be offloaded from the DPU complex to the switching complex.

Clause 11: The method of any of clauses 1-10, wherein the returning the policy enforcement is performed in response to determining that the communication session to be offloaded from the DPU complex to the switching complex no longer meets the criterion for offloading policy enforcement of the communication session to be offloaded from the DPU complex to the switching complex.

Clause 12: A system for managing connections or bidirectional flows of a communication session in a software defined network (SDN), the system comprising:
a smart switch comprising:
  a digital processing unit (DPU) complex comprising one or more DPUs, and
  a switching complex comprising one or more network processing units (NPUs),
  wherein:
    the DPU complex is configured to disaggregate enforcement of policies of the SDN from hosts of the SDN,
    the switching complex is configured to perform network routing of packets in the SDN,
  the hosts are implemented on servers communicatively coupled to network interfaces of the SDN;
  the system configured to perform operations comprising:
    cause the hosts to offload, from the hosts of the SDN to the DPU complex, processing of a plurality of communication sessions in accordance with packet processing rules associated with the SDN;
    storing, by the DPU complex, session information for the communication sessions in a connection table;
    determining that one of the communication sessions meets a criterion for offloading policy enforcement of the communication sessions from the DPU complex to the switching complex;
    in response to the determining, sending, to the switching complex, a request to offload policy enforcement of the determined communication session from the DPU complex to the switching complex;
    in response to the request, synchronizing, between the DPU complex and the switching complex, the session information associated with the determined communication session, wherein the synchronizing enables data flows associated with the determined communication session to be processed by the switching complex; and
    performing, by the switching complex, policy enforcement of subsequent data flows for the determined communication session that was offloaded from the DPU complex to the switching complex.

Clause 13: The system of clause 12, wherein the request comprises a FastPath++ packet that includes matches and actions for a given policy.

Clause 14: The system of any of clauses 12 and 13, wherein the switching complex is configured to create a data flow based on the matches and actions and process the determined communication session locally in the switching complex without forwarding packets associated with the determined communication session to the DPU complex.

Clause 15: The system of any of clauses 12-14, wherein the matches and actions include encapsulation with a SRC IP and DST IP.

Clause 16: The system of any of clauses 12-15, the system configured to perform operations comprising sending an additional FastPath++ packet to terminate processing of the determined communication session by the switching complex.

Clause 17: The system of any of clauses 12-16, wherein the switching complex is configured to use an age of the determined communication session to determine when to stop or remove the determined communication session that was offloaded from the DPU complex to the switching complex.

Clause 18: The system of any of clauses 12-17, wherein the switching complex is configured to terminate processing of determined communication session in response to receiving a FIN/FIN ACK/ACK for the one communication session.

Clause 19: The system of any of clauses 12-18, wherein the determining that the communication session meets the criterion comprises meeting a bandwidth threshold.

Clause 20: A smart switch configured to process bidirectional flows of a communication session in a software defined network (SDN), the smart switch comprising:
a digital processing unit (DPU) complex comprising one or more DPUs, and
a switching complex comprising one or more network processing units (NPUs),
wherein:
  the DPU complex is configured to disaggregate enforcement of policies of the SDN from hosts of the SDN, the switching complex is configured to perform network routing of packets in the SDN, the hosts are implemented on servers communicatively coupled to network interfaces of the SDN, the smart switch configured to perform operations comprising:

receiving a request to offload policy enforcement of one of the communication sessions from the DPU complex to the switching complex, the request generated in response to determining that the one of the communication sessions meets a criterion for offloading policy enforcement of the communication sessions to the switching complex;

synchronizing, by the DPU complex to the switching complex, packet processing rules associated with the communication session to be offloaded from the DPU complex to the switching complex, wherein the synchronizing enables data traffic associated with the communication session to be offloaded from the DPU complex to the switching complex to be processed by the switching complex, and wherein the synchronizing is based on session information stored by the DPU complex in a connection table, the session information for the communication session that was offloaded from the DPU complex to the switching complex; and based on the packet processing rules, performing policy enforcement of subsequent data traffic for the communication session that was offloaded from the DPU complex to the switching complex.

What is claimed is:

1. A method for managing data flows of communication sessions in a software defined network (SDN) implementing a smart switch comprising:
   a digital processing unit (DPU) complex comprising one or more DPUs, and
   a switching complex comprising one or more network processing units (NPUs),
   wherein:
      the DPU complex is configured to disaggregate enforcement of policies of the SDN from hosts of the SDN,
      the switching complex is configured to perform network routing of packets in the SDN,
      the hosts are implemented on servers communicatively coupled to network interfaces of the SDN,
   the method comprising:
   causing the hosts to offload, from the hosts of the SDN to the DPU complex, processing of a plurality of communication sessions in accordance with packet processing rules associated with the SDN;
   storing, by the DPU complex in a connection table, session information for the plurality of communication sessions that were offloaded from the hosts of the SDN;
   determining that one of the communication sessions meets a criterion for offloading policy enforcement of the communication sessions from the DPU complex to the switching complex, wherein the criterion indicates that a given communication session is to be offloaded from the DPU complex to the switching complex;
   in response to the determining, sending, to the switching complex, a request to initiate processing of policy enforcement for packets of the communication session to be offloaded from the DPU complex to the switching complex;
   in response to receiving the request, synchronizing, between the DPU complex and the switching complex, the session information associated with the communication session to be offloaded from the DPU complex to the switching complex, wherein the synchronizing enables data flows associated with the communication session to be offloaded from the DPU complex to the switching complex to be processed by the switching complex; and
   performing, by the switching complex, policy enforcement of subsequent data flows for the communication session that was offloaded from the DPU complex to the switching complex.

2. The method of claim 1, wherein the request comprises a FastPath++ packet that includes matches and actions for a given policy.

3. The method of claim 2, wherein the switching complex is configured to create a data flow based on the matches and actions and process the communication session to be offloaded from the DPU complex to the switching complex locally in the switching complex without forwarding packets associated with the one communication session to the DPU complex.

4. The method of claim 3, wherein the matches and actions include encapsulation with a SRC IP and DST IP.

5. The method of claim 1, further comprising sending an additional FastPath++ packet to terminate processing of the communication session to be offloaded from the DPU complex to the switching complex by the switching complex.

6. The method of claim 1, wherein the switching complex is configured to use an age of the communication session to be offloaded from the DPU complex to the switching complex to determine when to stop or remove the communication session to be offloaded from the DPU complex to the switching complex.

7. The method of claim 1, wherein the switching complex is configured to terminate processing of the communication session to be offloaded from the DPU complex to the switching complex in response to receiving a FIN/FIN ACK/ACK for the communication session to be offloaded from the DPU complex to the switching complex.

8. The method of claim 1, wherein the determining that the communication session to be offloaded from the DPU complex to the switching complex meets the criterion comprises meeting a bandwidth threshold.

9. The method of claim 1, wherein the synchronization comprises parsing a plurality of packet processing rules to identify packet processing rules that are applicable to a source or destination of the communication session to be offloaded from the DPU complex to the switching complex.

10. The method of claim 1, further comprising returning policy enforcement of the one communication session to the DPU complex.

11. The method of claim 10, wherein the returning the policy enforcement is performed in response to determining that the communication session to be offloaded from the DPU complex to the switching complex no longer meets the criterion for offloading policy enforcement of the communication session to be offloaded from the DPU complex to the switching complex.

12. A system for managing connections or bidirectional flows of a communication session in a software defined network (SDN), the system comprising:
   a smart switch comprising:
      a digital processing unit (DPU) complex comprising one or more DPUs, and
      a switching complex comprising one or more network processing units (NPUs),
      wherein:

the DPU complex is configured to disaggregate enforcement of policies of the SDN from hosts of the SDN, the switching complex is configured to perform network routing of packets in the SDN, the hosts are implemented on servers communicatively coupled to network interfaces of the SDN;

the system configured to perform operations comprising:

cause the hosts to offload, from the hosts of the SDN to the DPU complex, processing of a plurality of communication sessions in accordance with packet processing rules associated with the SDN;

storing, by the DPU complex, session information for the communication sessions in a connection table;

determining that one of the communication sessions meets a criterion for offloading policy enforcement of the communication sessions from the DPU complex to the switching complex;

in response to the determining, sending, to the switching complex, a request to offload policy enforcement of the determined communication session from the DPU complex to the switching complex;

in response to the request, synchronizing, between the DPU complex and the switching complex, the session information associated with the determined communication session, wherein the synchronizing enables data flows associated with the determined communication session to be processed by the switching complex; and performing, by the switching complex, policy enforcement of subsequent data flows for the determined communication session that was offloaded from the DPU complex to the switching complex.

13. The system of claim 12, wherein the request comprises a FastPath++ packet that includes matches and actions for a given policy.

14. The system of claim 13, wherein the switching complex is configured to create a data flow based on the matches and actions and process the determined communication session locally in the switching complex without forwarding packets associated with the determined communication session to the DPU complex.

15. The system of claim 14, wherein the matches and actions include encapsulation with a SRC IP and DST IP.

16. The system of claim 12, the system configured to perform operations comprising sending an additional FastPath++ packet to terminate processing of the determined communication session by the switching complex.

17. The system of claim 12, wherein the switching complex is configured to use an age of the determined communication session to determine when to stop or remove the determined communication session that was offloaded from the DPU complex to the switching complex.

18. The system of claim 12, wherein the switching complex is configured to terminate processing of determined communication session in response to receiving a FIN/FIN ACK/ACK for the one communication session.

19. The system of claim 12, wherein the determining that the communication session meets the criterion comprises meeting a bandwidth threshold.

20. A smart switch configured to process bidirectional flows of a communication session in a software defined network (SDN), the smart switch comprising:

a digital processing unit (DPU) complex comprising one or more DPUs, and a switching complex comprising one or more network processing units (NPUs), wherein:

the DPU complex is configured to disaggregate enforcement of policies of the SDN from hosts of the SDN, the switching complex is configured to perform network routing of packets in the SDN, the hosts are implemented on servers communicatively coupled to network interfaces of the SDN, the smart switch configured to perform operations comprising:

receiving a request to offload policy enforcement of one of the communication sessions from the DPU complex to the switching complex, the request generated in response to determining that the one of the communication sessions meets a criterion for offloading policy enforcement of the communication sessions to the switching complex;

synchronizing, by the DPU complex to the switching complex, packet processing rules associated with the communication session to be offloaded from the DPU complex to the switching complex, wherein the synchronizing enables data traffic associated with the communication session to be offloaded from the DPU complex to the switching complex to be processed by the switching complex, and wherein the synchronizing is based on session information stored by the DPU complex in a connection table, the session information for the communication session that was offloaded from the DPU complex to the switching complex; and based on the packet processing rules, performing policy enforcement of subsequent data traffic for the communication session that was offloaded from the DPU complex to the switching complex.

* * * * *